July 11, 1933.  M. SOSS  1,917,556
COMBINATION MOWING AND CULTIVATING MACHINE
Filed Oct. 5, 1931  2 Sheets-Sheet 1
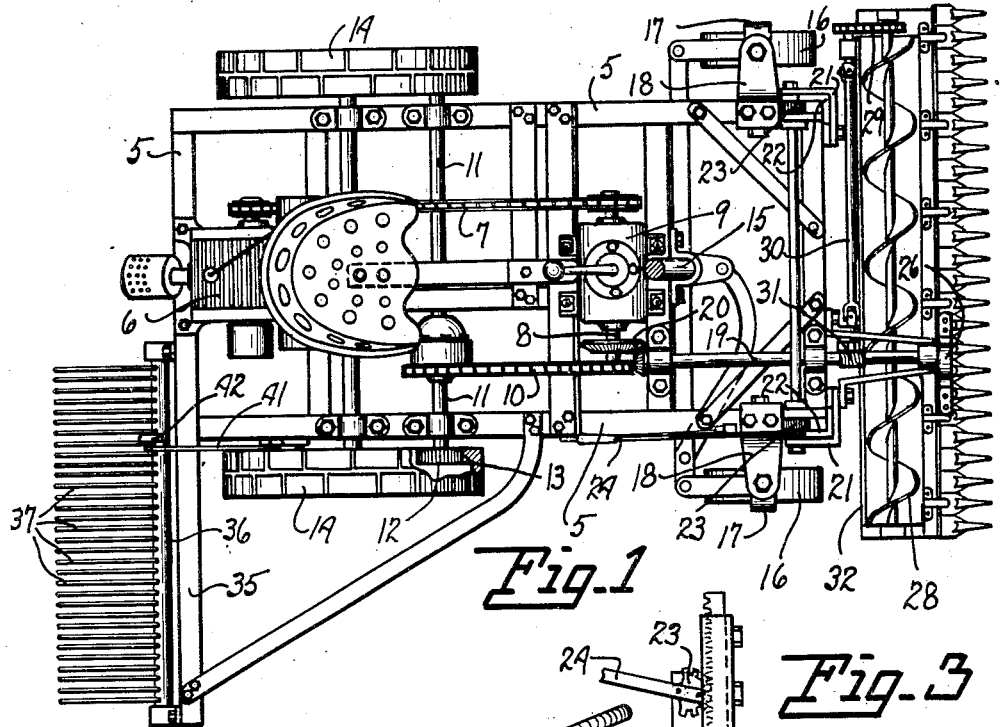
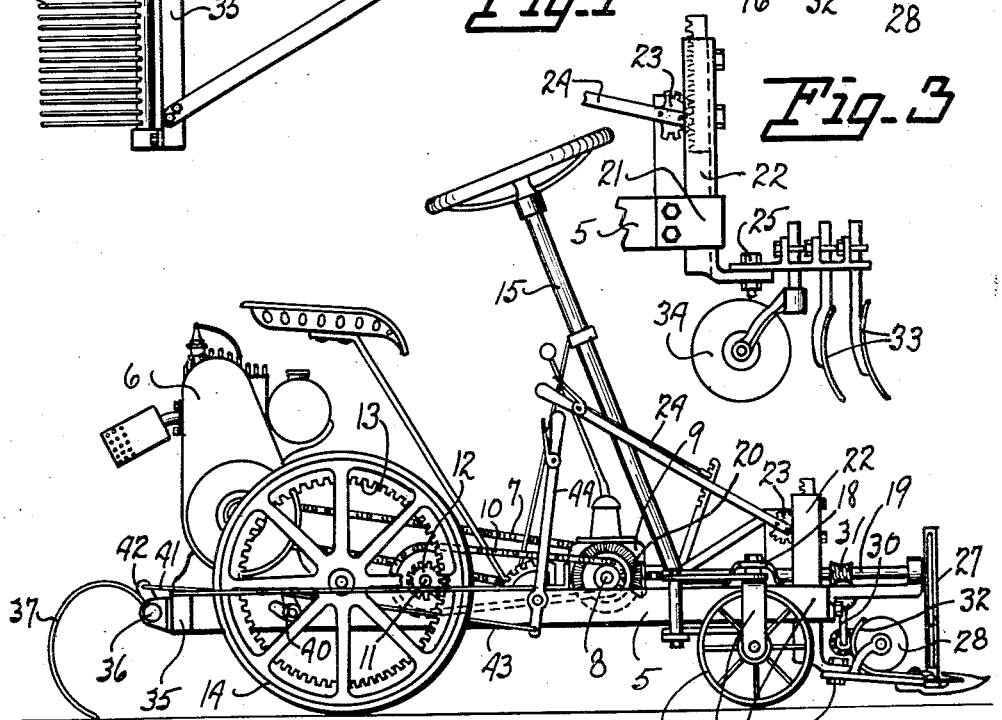
INVENTOR.
Mark Soss
BY
Glenn L. Fish
ATTORNEY.

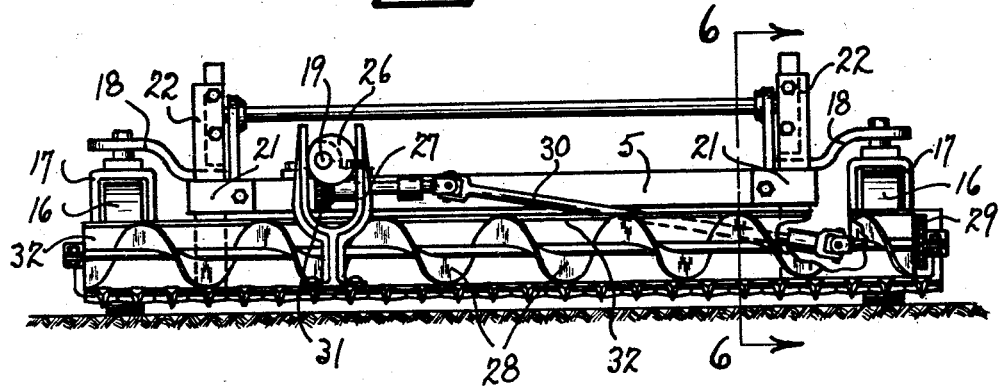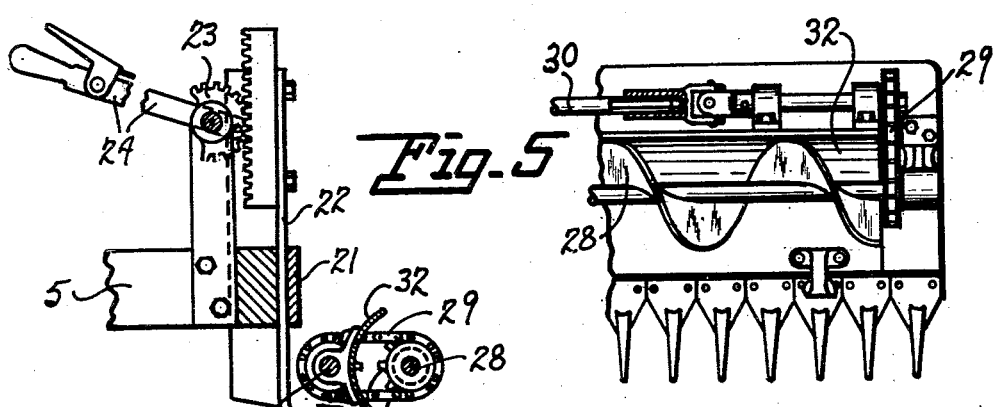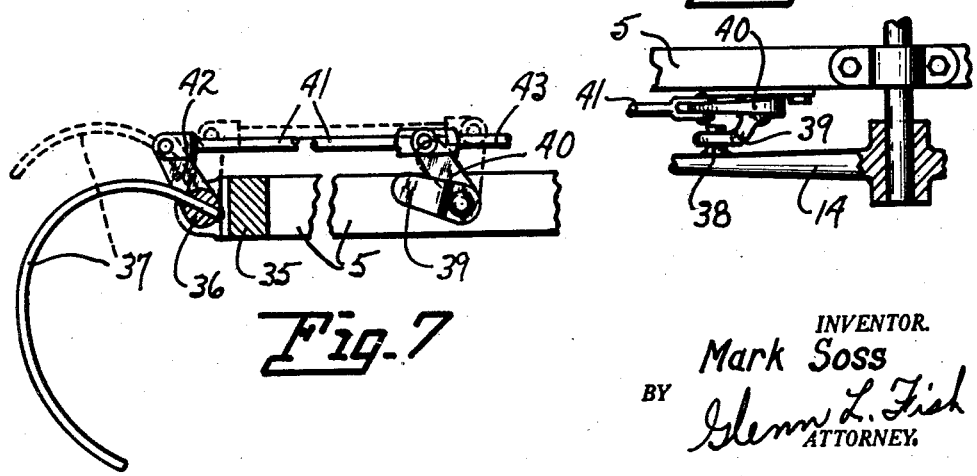

Patented July 11, 1933

1,917,556

UNITED STATES PATENT OFFICE

MARK SOSS, OF SPOKANE, WASHINGTON

COMBINATION MOWING AND CULTIVATING MACHINE

Application filed October 5, 1931. Serial No. 566,896.

My invention relates to combination mowing and cultivating machines and is an improvement over my prior patent entitled "Lawn mowers", No. 1,770,091, issued July 8, 1930, and also over the device disclosed in my co-pending patent application, Serial No. 334,244. Certain objects of my present invention are to provide a machine embodying means whereby different agricultural implements may be connected thereto and operated thereby. Another object is to provide novel conveyor means disposed transversely of a grass cutting machine or attachment whereby grass and the like is discharged to one side of the machine. A still further object is to provide novel trip means for raising the rear raking end or attachment of the machine.

With the above and other objects in view which will appear as the description proceeds, the invention consists of the novel construction, adaptation, combination and arrangement of parts hereinafter described and claimed. These objects are accomplished by devices illustrated in the accompanying drawings; wherein:

Figure 1 is a top plan view of the machine;

Fig. 2 is a view in side elevation of the same;

Fig. 3 is an enlarged detail view in side elevation of the cultivator and disc attachments;

Fig. 4 is a view in front elevation of the sickle bar operating means and associated parts;

Fig. 5 is an enlarged detail view in horizontal section and plan showing the driving connection means for the conveyor;

Fig. 6 is an enlarged view in vertical section showing the lifting means for the sickle bar and taken substantially on a broken line 6—6 of Fig. 4;

Fig. 7 is a detail view in vertical section showing the rake tripping means; and Fig. 8 is an enlarged fragmentary view in plan of the rake tripping means.

Referring to the drawings throughout which like reference numerals indicate like parts, the numeral 5 designates a rectangular frame as a whole. Said frame has an engine 6 mounted on its rear end whose shaft has a sprocket and chain connection 7 with one end of the main shaft 8 of a transmission 9 which is provided with the usual gears for reverse, high, low and intermediate speeds that are not shown in detail in the drawings. The other end of said transmission shaft has a sprocket and chain connection 10 rearwardly to a shaft 11 transversely mounted on the frame 5 and provided on each end with a pinion 12 meshing with internal gear teeth 13 provided on rear drive wheels 14 thus providing propulsion means for the machine as will be understood. The steering means for the machine comprises a steering post 15 whose lower end is connected, by means of a series of arms and levers in the usual manner, to the forward wheels 16 that are mounted in U-brackets 17 which are pivotally connected to bracket arms 18 secured to the frame 5.

One of the novel features of my invention resides in the means provided whereby different attachments, such as mowers, cultivators and the like, may be connected to the forward end of the machine and operated by its engine. In carrying out this means I provide a forwardly extending shaft 19 connected by bevel gears 20 to the transmission shaft 8. A pair of upstanding box brackets 21 are fixed to the forward end of the frame 5 and a pair of shoe bars 22 are slidably mounted within said brackets. Said bars have rack teeth disposed in mesh with gear quadrants 23 pivotally mounted on the upstanding brackets and provided with levers 24 whereby the bars may be raised or lowered. The lower or shoe ends of said bars are provided with bolts 25 whereby the different implements or attachments may be secured thereto.

In order to attach a sickle bar to the foregoing means, its floor member is secured thereto by means of the bolts 25. The forward end of the shaft 19 has a cam 26 fixed thereto which is disposed within a U-yoke 27 whose lower end is connected to the slidable cutting tooth bar of the sickle bar in any suitable manner. Thus rotary movement of said shaft will cause reciprocative movement of the sickle bar teeth. Another novel feature of my invention resides in the worm conveyor that is used in connection with the sickle bar or other mowing attachment. Said conveyor comprises a transversely disposed screw flange member 28 whose ends are journaled in bearings fixed to the floor of the sickle bar. At one end of said screw member a chain and sprocket connection is made with a universally jointed shaft 30 whose remote end is connected by a gear arrangement with a worm 31 fixed on the shaft 19. An upturned apron 32 is fixed immediately rearward of said worm conveyor and prevents grass or the like from moving back into the machine while the screw conveyor delivers same to the side where it is discharged free of the machine. Referring to Fig. 3, other attachments may be connected to shoes of the shoe bars such as the cultivator members 33 or the disc members 34 for breaking up soil.

The rear member of the frame 5 is extended out to one side, as shown at 35 in Fig. 1, and a bar shaft 36 has its ends pivotally connected thereto. Spaced apart downwardly curving rake teeth 37 have their upper ends fixed to said bar shaft and their lower ends are adapted to engage the ground. I have provided means whereby said teeth are tripped or raised at each revolution of the rear drive wheels 14. Said means comprises a small boss or projection 38 fixed to a spoke of the drive wheels that is arranged to contact with a projection 39 on a bell crank lever 40 pivoted to a side of the frame 5 and connected by a rod 41 to a short lever 42 fixed to the bar 36 which carries the rake teeth. At each revolution of said wheel the boss therefore carries said bell crank and connecting rod forward thus raising the rake teeth to the dotted position shown in Fig. 7. Another rod 43 extended forward from said bell crank to a hand lever 44 provides means whereby said bell crank may be pivotally moved forward until its projection is out of the path of the boss on the rear wheel. This arrangement provides means whereby the rake teeth may be retained in the raised position when not in use, and when lowered and in use the tripping means automatically raises the teeth momentarily at each revolution of the rear wheels thus releasing the grass that has accumulated in front of the rake teeth.

Having thus described my invention, it being understood that minor changes in its construction and arrangement may be resorted to without departing from the scope and spirit of the invention, what I claim and desire to secure by Letters Patent of the United States is:—

1. In a combination mowing and cultivating machine of the character described comprising a frame, a pair of upstanding box brackets fixed to the forward end of the frame, a pair of shoe bars slidably mounted in said brackets and having rack teeth, means for raising and lowering said shoe bars comprising levers with quadrants having teeth in mesh with the rack teeth on the shoe bars and means for securing agricultural implements such as mowing and cultivating attachments to the lower shoe ends of said shoe bars.

2. The combination with a machine of the character described having an engine and transmission, a sickle bar mowing apparatus detachably connected to the forward end of the machine, a worm conveyor disposed transversely of the sickle bar apparatus and adapted to deliver herbage cut by the sickle bar to one side and free of the machine, a shaft extended forward from the transmission arranged to operate both the sickle bar and the worm conveyor, a cam fixed to the shaft, a yoke receiving the cam and fixed to the sickle bar for reciprocal movement thereof, and a universal shaft forming a connection between the forwardly extending shaft and the worm conveyor for causing rotary movement of said worm conveyor.

3. The combination with a machine of the character described having an engine and transmission, a sickle bar mowing apparatus detachably connected to the forward end of the machine, a worm conveyor disposed transversely of the sickle bar apparatus and adapted to deliver herbage cut by the sickle bar to one side and free of the machine, a shaft extended forward from the transmission arranged to operate both the sickle bar and the worm conveyor, a cam fixed to the shaft, a yoke receiving the cam and fixed to the sickle bar for reciprocal movement thereof, and a universal shaft forming a connection between the forwardly extending shaft and the worm conveyor for causing rotary movement of said worm conveyor, and an apron fixed immediately rearward of the conveyor whereby cut herbage is prevented from passing back into the machine.

In testimony whereof I affix my signature.

MARK SOSS.